Feb. 18, 1936.                J. BARTHOLOWSKY                    2,031,358
                        APPARATUS FOR PRODUCING PERSPECTIVES
                              Filed April 24, 1933              6 Sheets-Sheet 3

INVENTOR:
JOHANNES BARTHOLOWSKY,

Feb. 18, 1936.                J. BARTHOLOWSKY                 2,031,358
                    APPARATUS FOR PRODUCING PERSPECTIVES
                        Filed April 24, 1933        6 Sheets-Sheet 4

INVENTOR:
JOHANNES BARTHOLOWSKY,

Feb. 18, 1936.   J. BARTHOLOWSKY   2,031,358
APPARATUS FOR PRODUCING PERSPECTIVES
Filed April 24, 1933   6 Sheets-Sheet 6

INVENTOR:
JOHANNES BARTHOLOWSKY,
By: his Atty.

Patented Feb. 18, 1936

2,031,358

UNITED STATES PATENT OFFICE 2,031,358

APPARATUS FOR PRODUCING PERSPECTIVES

Johannes Bartholowsky, Los Angeles, Calif.

Application April 24, 1933, Serial No. 667,667

9 Claims. (Cl. 33—64)

This invention relates to devices for and methods of reproducing or transforming plain or flat appearing objects into perspectives, plan or plastic structures, and even forced perspectives with distinct appearance of depth.

One of the objects of this invention is to make the production of perspectives from flat representations of objects demonstrable.

Another object is to provide points and lines for plastic perspectives from plain or flat pictures.

Another object is to provide an apparatus in which a top view or plan can be disposed at any desired angle or plane in which it is to be projected in perspective.

Another object is to provide an apparatus whereby different points of a flat though perspective illustration or representation can be projected to serve in building up a perspective plastic model or structure.

Another object is to utilize a camera, adjusted for a photographing of a natural performance and natural scenery, in conjunction with an apparatus holding a transparent supplemental miniature scenery, focused before the camera and adjusted to align with corresponding points of the natural scenery as seen through the camera, including and having provided means to utilize the focused and aligned transparent miniature to facilitate a building of a true supplemental and even forced perspective plastic structure, to be photographed together with the performance and natural scenery.

Other objects will appear from the following description and appended claims as well as from the accompanying drawings, in which:

Though it is not exactly difficult to make perspectives, it is, nevertheless, troublesome, or at least tedious, to illustrate a perspective clearly and so as to give the most natural impression, especially if it is desired to give the impression of depth to the representation.

In order to give a clearer understanding of advantages to be had with the use of the principles of this invention, it is deemed necessary to refer to different uses of perspectives.

A layman might be convinced and argue that any photograph is a perspective of the objects displayed therein, while an artist just naturally knows that a photograph is flat and appears flat, which is especially realized in the motion picture industry, for which the following may serve as a partial explanation.

In the motion picture industry it is not always possible to photograph performances in the natural surroundings suggested by the story.

Many makeshifts have been resorted to, but with respect to the gist of the above and following argument it may be said that the two principal procedures most commonly followed serve fully to explain and prove the above contention.

To create the appearance of a surrounding as natural as possible according to the suggestion of the story on which a motion picture is based with all the finer details, the lower parts, or substructures, or such parts most closely associated with the performance, are most comonly reproduced in natural size and in a condition to simulate the real and actual location suggested in or by the story.

However, the majority or greater number of details or finer parts, more particularly above the level of and at greater distances from the performance, are represented either by small miniatures or even photographs arranged close to the camera, with certain of their details or parts aligned as much as possible with the corresponding parts of the larger and full-size structures in the surrounding of the natural performance.

By these two principal procedures of using either a badly executed miniature or a photograph, the indisputable fact has been established, that a photograph used in the reproduction of motion pictures and though believed to be a perspective will always give a flat and very unnatural appearance in the finished motion picture.

In other words, a rephotographing of a photograph proves a photograph to be flat and not perspective, emphasizing the frequently repeated opinion that a camera is not as easily deceived as the bare eye.

But even a miniature, if badly or improperly executed or not sufficiently perspective, will also result in appearances or reproductions of somewhat flat or dead nature.

On the other hand, a properly executed or "forced" perspective miniature will easily result in a perfect reproduction, even to the point obtainable only with stereoscope contrivances, particularly with respect to the impression of depth in the finished picture.

Besides serving to demonstrate the transformation of flat representations into perspectives, the present invention involves producing miniatures that will give an impression of natural depth.

The expression "forced" perspective may require further explanation and illustration.

Figure 1:
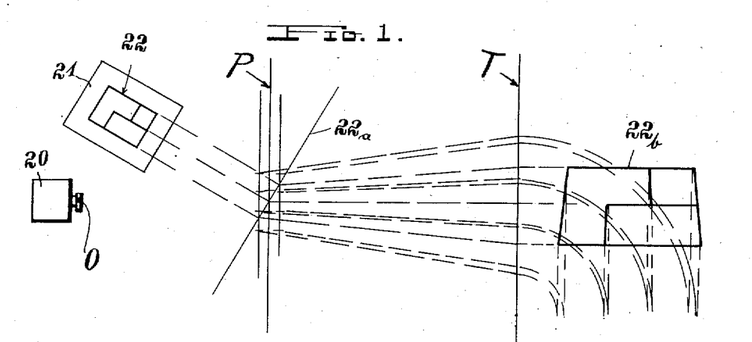
Fig. 1 is a diagrammatic illustration of a projection of a simple top plan view of an outline such as a floor plan or foundation into a perspective plan.

Considering the arrangement illustrated in Fig. 1, in order to assure sharp and correct markings and reproductions of fine points of any outline over a distance of any extent, there must, of course, be suitable means at the observation point O, to produce sharp and correct projections.

As previously hinted, the lens of a camera is more sensitive than any eye and a camera 20 is therefore roughly outlined at the observation point O, though other means may be used under suitable conditions and according to certain requirements in individual cases. Mounting, for instance, a sheet or partition of suitably thin material at the observation point, and providing a suitably small hole in that sheet would naturally also make it possible to concentrate the vision of an eye, placed behind and close to such a small hole, suitably for rough work.

Such concentrated vision of an eye through a small hole as well as the much more accurate vision through a camera may nevertheless be commonly termed vision from an observation point.

A projection-table T is preferably provided, upon the surface or top of which any desired representation of any object or article may be produced.

Figure 2:
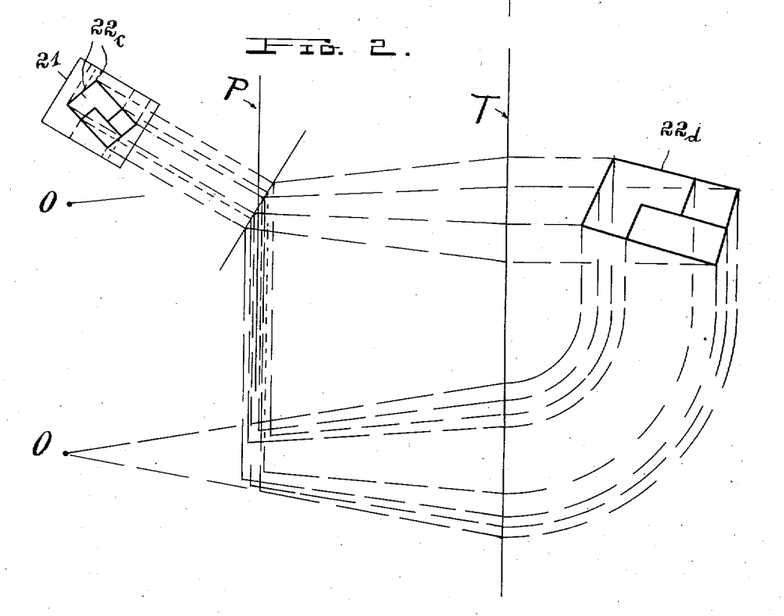
Fig. 2 is a diagrammatic illustration of the same plan shown in an inclined position on a sheet projected into a perspective plan.
Figure 3:
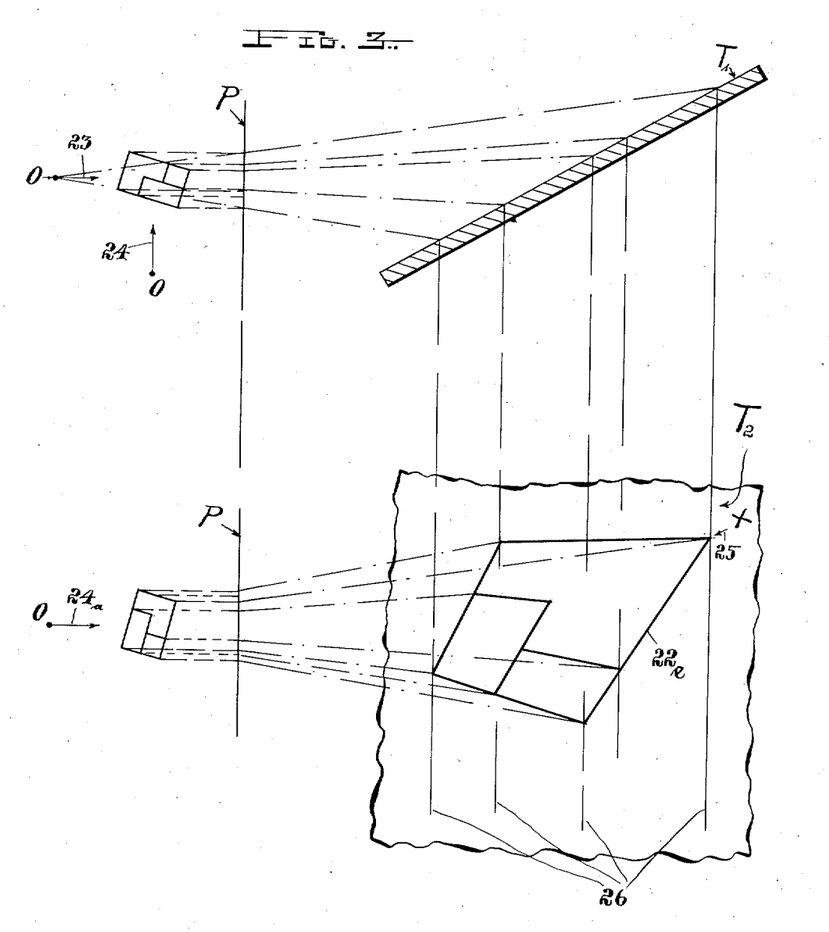
Fig. 3 is a diagrammatic illustration of a slightly modified form of projection of the same plan.

Intermediate the table T and the ovservation point O, a transparent plan, or sheet, or picture is disposed or interposed at the point indicated at P, in the illustrations of Figs. 1, 2, and 3.

Any plan, or sheet, or picture is preferably provided on a transparent material, such as the surface of a glass-plate, and such a plate is preferably mounted in a frame, as will be described more fully later on, that can be adjusted to any slanting or angular position with respect to the observation point O, though always somewhat transversely to the focal direction.

Providing the transparent sheet 21 with a floor or foundation plan of a simple form indicated at 22, and placing this transparent plan in an inclined position as indicated at 22a at the point P, would naturally make the upper line of the plan appear shorter than the lower line on the table T, to result in a projected reproduction of the form indicated at 22b in Fig. 1.

Drawing the same plan in an inclined position on the sheet 21 as indicated at 22c, and projecting and marking this plan on the vertical table-top T, results in the twofold tapered perspective indicated at 22d in Fig. 2.

Placing the same sheet 21 with the form 22c of the plan in a vertical position or plane at P as indicated and illustrated in Fig. 3, and placing the table top T in an inclined position, in other words, reversing the condition of the slanting surface over what has been described herebefore, instead of having the surface in the plane P inclined and the surface in the plane T vertical, in Fig. 3 having the table-surface inclined and the surface at P vertical, allows a projection and marking to result in the perspective 22e on the inclined table top as illustrated, T1 being edgewise, and T2 being a top view of the inclined table-top. The projection in the direction of the arrow 23 gives the horizontal lines 26 on the tabletop as marked upon the edge T1 and projected over the inclined top-view of the table-top.

Upon these horizontal lines previously marked on the inclined table-top, the projection in the direction of the arrow 24 gives the lateral points on the horizontal lines in the manner as marked over with respect to the arrow 24a upon the inclined table-top as illustrated in the top-plan view T2.

This perspective 22e is clearly intensified much over the perspective 22d, to be easily recognized, though the two perspectives are taken from opposite corners, 22e being perspective as it would appear to a person standing at or beyond x looking in the direction of the arrow 25.

From the above it will be clear that a projection through a vertical sheet at P upon an inclined surface or plane results in a reversal or reversed perspective, the frontmost corner appearing on the far side of the table-top.

Of course, a similar result can be obtained by placing the table top in a vertical position and placing the transparent sheet in an inclined plane, in the opposite direction with respect to the illustrations of Figs. 1 and 2, to bring the upper edge of the transparent sheet nearer to the observation point O instead of the lower edge.

Larger or smaller reproductions can be obtained by changing the distances either of the observation point with respect to the table top, or of the plane P between the stationary remaining positions of the observation point O and the table T.

Going only one step further, any article, object, or structure can easily be produced by similar projections and markings from a plain and flat picture or plan, to result in any desired perspective.

Any picture that is naturally already a perspective representation, though flat, as stated above, in the mind of an artist, if utilized and projected by markings of various points of the pictorial representation, can be reproduced in a much more intensified and more truly appearing perspective with respect to depth; and when utilized in projecting and marking of points for building up a plastic model, in the manner outlined above, results in a very distinctly intensified or "forced" perspective.

Such a newly created "forced" perspective rephotographed from a point as at "x" and in the direction indicated by the arrow 25 in Fig. 3, results in a picture that impresses an observer as to the depth or distance of the various objects or points in the pictures in an amazingly natural manner, or, in other words, gives a much more natural appearance and not at all as a flat photograph.

Any projection and use of flat floor-plans or of flat pictures in the manner set forth above serves to demonstrate the transformation of flat representations into perspectives, for students in schools, or for practical purposes.

In the motion-picture industry, moreover, it can also be used to create more nearly perfect pictures by the use of forced perspectives in the miniatures used in conjunction with the full-size performances and the close-up surroundings near the performer or near the points of performances.

Figure 4:
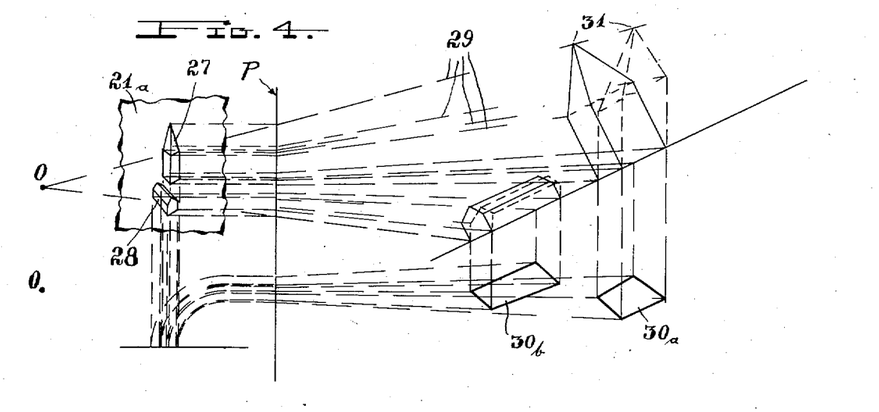
Fig. 4 is a diagrammatic illustration of a projection of small crude bodies from a flat sheet to perspective plastic representations.

While in the above, with reference to the illustrations of Figs. 1, 2, and 3, a very small and even crude simple plan has been used to demonstrate and illustrate its reproduction into a very distinct and even forced perspective by easily performed projections and markings; the illustration in Fig. 4 may equally well serve to demonstrate and illustrate the application of the principles of this invention to the transformation and projection of just as simple and crude structures, shown in a flat sheet, into very distinct desired plastic perspectives upon the table-top.

Disposing the transparent sheet 21a with the crude structures 27 and 28 thereon in the transverse plane P, the projection lines 29 make it clear that any point of height or elevation can be established as easily as the ground contours of these structures, and that these newly created and built-up structures are in the same or similar forced perspective, referred to above. The much greater space between the ground contour 30a and the ground-contour 30b, when compared with the space appearing from the flat picture 21a, together with the comparative difference of the uppermost height indicated at 31 with the depth of the projected structures, on the one hand, and corresponding points of sheet 21a on the other hand, must make it clear that such a newly created perspective in plastic imparts the impression of greater depth.

Inasmuch, however, as the projected structures in Fig. 4 again are nothing but sketches on paper, these structures naturally do not appear as well as they would on actually being built in the manner suggested. It must also be realized that the table may be set flatter or so that the structures will appear more favorably.

By varying the setting of the table, any desired degree of perspective can be produced, and, in determining on a certain degree of perspective by adjusting the table to a certain inclined position, after a ground- or floor-plan has been marked, the table can even be readjusted to fully flat or horizontal position, and the uprights of the structure can be provided in the form of sticks or pasteboard, to receive markings of height or elevation by projections of the type and in the manner set forth above.

Figure 5:
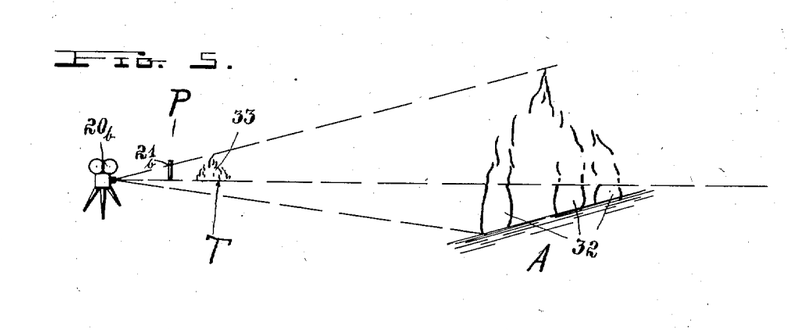
Fig. 5 is a diagrammatic illustration of an arrangement of a flat plan illustration disposed before a camera for the creation of a plastic miniature to be used in conjunction with a natural performance for which the camera is focused.

When used in the motion picture industry, by having the transparent picture sheet 21b mounted at a suitable but certain distance from the camera 20b, as illustrated in Fig. 5, this arrangement makes it possible that the substructure 32, in close proximity of the actual performance at A, and customarily built up in full size, can be checked off on the showing in the picture 21b so that corresponding parts of the picture and the substructure align properly.

Once this distance between the picture and the camera has been established and checked off, this distance can be maintained accurately until a miniature has been produced at eventually the point indicated at 33, properly focused through the picture 21b.

A miniature produced under this checked off arrangement must naturally also align properly with the substructure when the picture 21b is removed between the finished miniature and the camera. A miniature produced as explained above gives and assures a desired impression of depth in the finished motion picture produced from such a combination of the miniature and the substructure.

From the above it must also be clear that the substructure can be built to suit requirements for a performance, and that a transparent sheet can then be inserted in the plane at P, to receive proper aligning markings according to the upper ends of the substructure, to which any desired or required upper ornamentations can be added on the transparent sheet by an artist, and that, furthermore, a miniature can be produced from such a fancy transparent sheet by a projection and further procedure in the manner set forth above, to finally, later on, be photographed together with the performance and full-size substructures, to result in the desired amazingly natural appearing finished motion picture.

Figure 6:
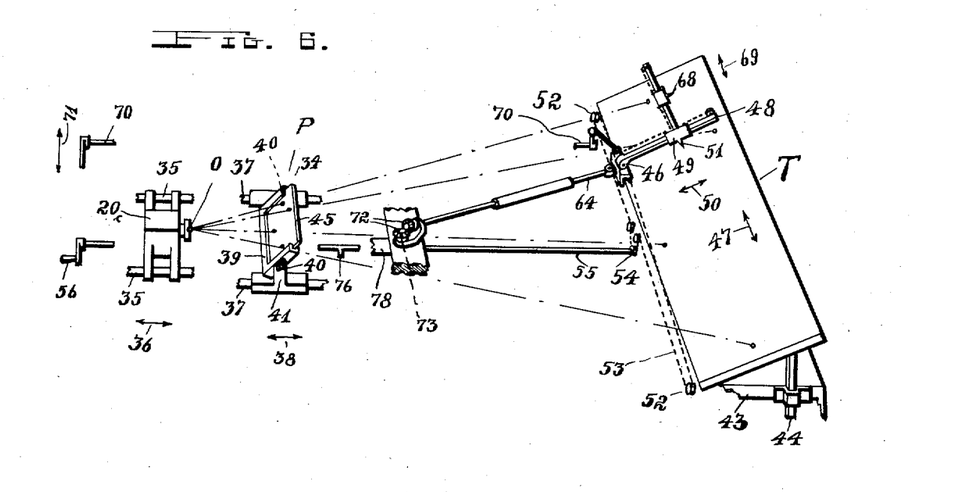
Fig. 6 is a fragmentary perspective illustration of different parts of the apparatus arranged according to this invention, partly broken away for clearness.

In Fig. 6, the observation-point O is again embodied in a camera, as at 20c, the plane P being embodied in the framework as at 34, and the table T being at the opposite end, and, in order to provide for the longitudinal adjustments of distances referred to above, the camera is mounted shiftably on the supports 35 for movements in the directions of the arrows 36, and the framework 34 is also mounted shiftably, as on the supports 37, for movements in the directions of the arrows 38.

The frame proper, indicated at 39, is swingably mounted at 40 on the uprights 41, whereby the frame 39 can be adjusted to the different inclined positions in which a picture or plan is to be held as set forth above.

Figure 7:
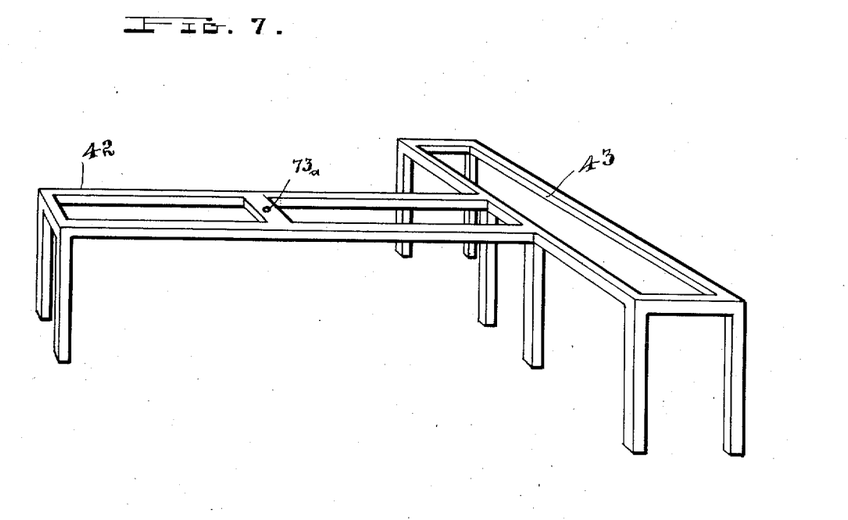
Fig. 7 is a perspective view of a table or framework for the apparatus.

The whole apparatus, including the camera, and shiftable frame 39, as well as the table-top T, is preferably mounted on a rigid larger framework 60 of the type illustrated in Fig. 7, the camera to be near the end 42 and the table-top to be near or rather on the end 43.

The table top can be adjusted to any slanting position by any suitable means such as indicated at 44 in Fig. 6.

Mechanisms by which desired points, focused through the camera and through the inserted transparent plate 45, can be indicated with reference to the table T, include a base 46 shiftable on the frame-end 43 back and forth across the whole width of the table top in the directions of the arrows 47. The base 46 supports an arm 48 upon which a block 49 is shiftable back and forth in the directions of the arrows 50, an indicating pointer 51 being provided by which any focused point can be reached and marked by the operator anywhere on the table top. Pulleys 52 are mounted on the frame-end 43, supporting a flexible member 53 of which the opposite ends are secured or connected by any suitable means, not shown, to the base 46, the flexible member being in operative engagement with a pulley 54 on the end of shaft 55, which extends to a point near the operator's position, having a handle 56 by which the operator can set the base 46 with the pointer 51 at any position on the table to which the apparatus is focused.

Figure 11:
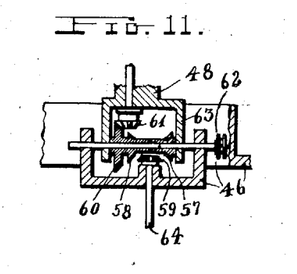
Fig. 11 is a fragmentary section of the operating parts as seen in the direction of the arrows 11—11 in Fig. 8.

The base 46 is made in form of a housing to enclose the gears 57, 58, 59, 60, and 61, as well as the pulley 62 and the shiftable yoke 63, illustrated in detail in Fig. 11, operative by the shaft 64, extending from the base also in the direction towards the operator's position.

Either of the gears 57 or 58 can be brought into operative engagement with the gear 59 by means of the shiftable yoke 63, whereby any movement of the shaft 64 can be transmitted to, either, the pulley 62, or the gear 60.

Movements of the pulley 62 result in a shifting of the block 49 in the directions of the arrows 50.

Figure 8:
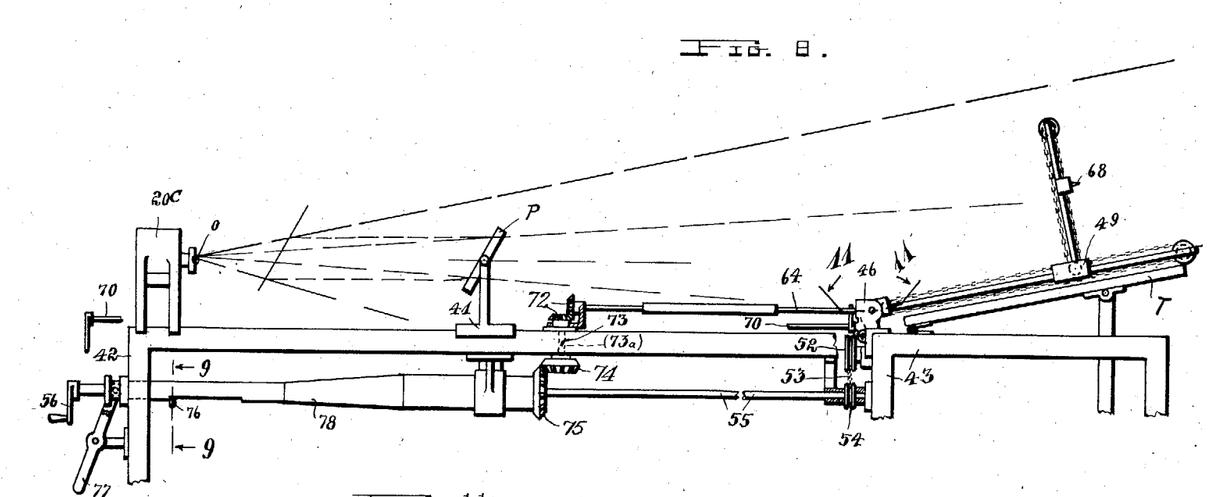
Fig. 8 is a fragmentary side elevation, partly broken away to show otherwise inner and covered operating parts, of the cooperating sections and parts of the apparatus designed to operate according to this invention.
Figure 9:
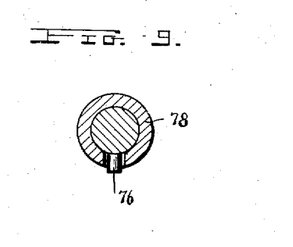
Fig. 9 is a cross section on line 9—9 of Fig. 8.
Figure 14:
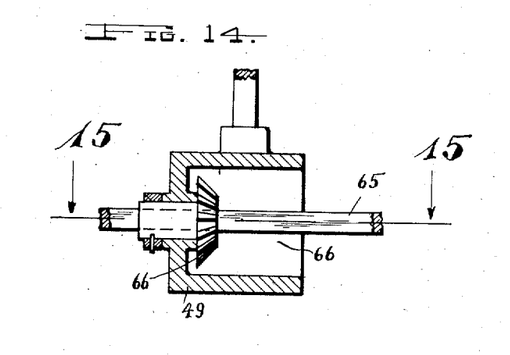
Fig. 14 is a cross section of the gear-box located over the table, as taken on line 14—14 of Fig. 15.
Figure 15:
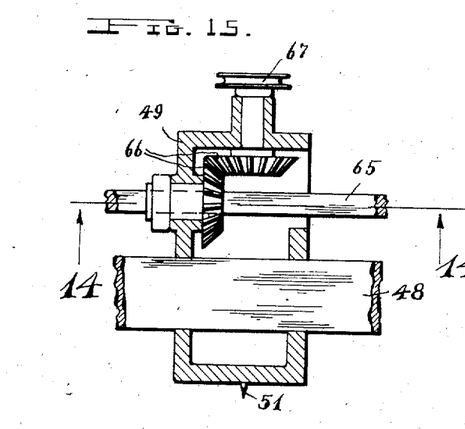
Fig. 15 is a section on line 15—15 of Fig. 14.

Movements of the gear 60 result in a turning of the gear 61 and of the shaft 65, and thereby of the gears 66 with the operatively connected pulley 67, illustrated in detail in Figs. 14 and 15, for up and down shifting movements of the pointer 68, illustrated in Figs. 6 and 8, in the directions of the arrows 69.

No particular claim is made to any of these details since applicant does not limit himself to such details but merely to the adjustability of pointers to indicate positions of points of a focused picture or plan in the manner set forth, and it is therefore not attempted to show any particular detailed mechanism or all parts and details of the many mechanisms that can be provided for the purposes brought out.

A connection 70 is provided on the shiftable yoke 63, to extend to a point near the operator's position, for movements in the directions of the arrows 71, indicated in Fig. 6 somewhat detached for sake of clearness of other parts.

The shaft 64, indicated in Figs. 6 and 8, receives its movements through the operative engagement of the gears 72, seen above the main framework in Figs. 6 and 8 by way of the shaft 73 from the gear 74, seen below the main framework in Fig. 8, which in turn is operative by the gear 75 by means of the handle 56, the gear 75 being turnable by means of the pin-engagement 76, illustrated in detail in Fig. 12.

Figure 12:
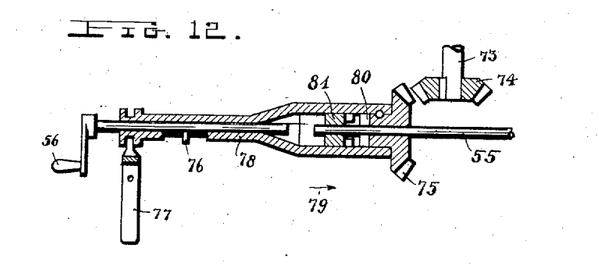
Fig. 12 is a fragmentary longitudinal section through the controlling and coupling mechanism.
Figure 13:
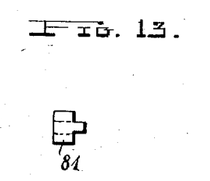
Fig. 13 is a top plan view of the coupling member.

By means of the lever 77, the gear 75 can be brought into engagement with the gear 74 when the sleeve 78 is shifted in the direction of the arrow 79; while, by a shifting in the opposite direction, a coupling engagement 80 on the rear end of the hub of the gear 75 can be brought into engagement with a coupling member 81 on the shaft 55 as illustrated in Fig. 12.

For moving the base 46 back and forth over the table top, the lever 77 is moved to bring the gear-coupling 80 into engagement with the coupling member 81, involving a shifting of the sleeve 78 in the direction opposite to the arrow 79; while a movement of the lever 77 to cause the sleeve 78 to move in the direction of the arrow 79 results in an engagement between the gears 75 and 74 for a setting of either the pointer 51 or the pointer 68.

One or the other of the pointers 51 or 68 can be set by a shifting of the yoke 63 by means of the connection 70 operated in either of the directions of the arrows 71, to bring either the pulley 62 or the gears 60 and 61 into operation as set forth above.

Figure 10:
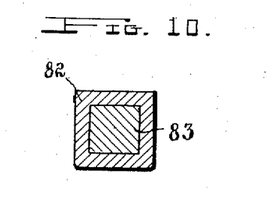
Fig. 10 is a cross section similar to Fig. 9 of a slightly modified form.

Inasmuch as the base 46 with the supported pointers must move laterally to a large extent, the shaft 73, indicated in Fig. 6, is mounted on a pivot when in its proper position at the point indicated at 73a in the main framework illustrated in Fig. 7, so that the larger portion of the whole mechanism illustrated in Fig. 6 can swing around this pivot while the different mechanisms are in operative engagement. The shafts 70 and 64 naturally must be made extensible or telescopic with means for turning engagement, either, such as indicated at 76, or by providing cornered, such as square, shafts one within the other, as, for instance, a square shaft 83 within a tube 82, illustrated in cross section in Fig. 10, having suitable engagement to slidingly transmit a rotating movement, the gist of the invention as far as mechanisms are concerned being to bring the pointers to positions to indicate any position determinable by means of an accurate vision means, such as a camera, through a transparent sheet at the plane P, from the operator's stand while making observations through the camera.

Having thus described my invention, I claim:

1. An apparatus comprising a main framework with a longitudinal portion and a transverse portion at the far end, a vision localizing means on the near end of the framework, a base for production purposes on the far end of the framework, and a small frame adjustably mounted between the far and near ends and including means for tiltably holding matter to be produced on the base according to the appearance from the vision localizing means.

2. An apparatus comprising a main framework with a base for production purposes at the far end, a vision localizing means mounted on the near end of the framework shiftable in the direction towards the base, and a small frame mounted on the main frame between the near end and the base and including means tiltable around an axis transversely to the line of vision and designed for holding matter to be reproduced upon the base.

3. An apparatus comprising a main framework with a production base at the far end, a vision localizing means shiftably mounted on the near end of the framework, and a secondary frame mounted on the framework shiftable in the line of vision between the vision localizing means and the base including means whereby the secondary frame is tiltable around an axis transversely to the line of vision and having also means for exchangeably holding matter to be reproduced on the base.

4. An apparatus comprising a main framework with a production base at the far end, a vision localizing means shiftably mounted on the near end of the framework, a secondary frame mounted on the framework between the vision localizing means and the base having means for holding matter to be produced on the production base, and controlling mechanisms including indicators operative by an operator at the near end and adapted to be set at points above the base with respect to points selected from said matter as seen through the vision localizing means.

5. An apparatus comprising a main framework with a production base at the far end, a vision localizing means on the near end of the framework, a secondary frame mounted on the main framework shiftable between the far and near ends, and a tiltable top on the base swingable around an axis transversely to the line of vision.

6. An apparatus comprising a main framework with a production base at the far end, a vision localizing means on the near end of the framework, a secondary frame mounted on the main framework shiftable between the near and far ends and having means for holding matter to be produced on the production base, a tiltable top on the base swingable around an axis transversely to the line of vision, and controlling mechanisms including indicators operative by an operator at the near end adjustable to points above the base with respect to points selected from said matter as seen through the vision localizing means.

7. An apparatus comprising a main framework with a production base at the far end, a vision localizing means on the near end of the framework, a secondary frame mounted on the main framework shiftable between the near and far ends and having means for holding matter to be produced on the production base, control members at the near end, indicators movable above the base, and mechanisms operatively connected with the indicators and control members.

8. An apparatus comprising a main framework with a production base at the far end, a vision localizing means on the near end of the framework, a secondary frame mounted on the main framework shiftably between the near and far ends and having means for holding matter to be produced on the production base, a top on the base, means for swingably supporting the top on the base on an axis transversely to the vision line, means for adjusting the top to different inclines, and controlling mechanisms including indicators adjustable to points above the top with respect to points selected from said matter as seen through the vision localizing means and operative from the near end.

9. An apparatus comprising a main framework with a production base at the far end, a vision localizing means on the near end of the framework, a secondary frame mounted on the main framework shiftable between the near and far ends and having means for holding matter to be produced in the production base, control members at the near end, an indicator for elevation points, another indicator for lateral points, both indicators adjustable to points above the base with respect to points selected from said matter as seen through the vision localizing means, means shiftably mounted across the framework for supporting the indicators, operating means for the supporting means, other operating means for each of the indicators, means for selectively connecting the operating means for either of the indicators to the control members, and means for selectively connecting the operating means for either the shiftable supporting means or the indicators.

JOHANNES BARTHOLOWSKY.